United States Patent
Lee et al.

(10) Patent No.: US 10,843,343 B2
(45) Date of Patent: Nov. 24, 2020

(54) ACCESS DETECTING SYSTEM

(71) Applicant: SUN HST Co., Ltd., Ulsan (KR)

(72) Inventors: Jin Yong Lee, Ulsan (KR); Young Kuk Kwon, Busan (KR); Myoung Hoon Choi, Busan (KR); Su Jin Lee, Ulsan (KR)

( * ) Notice: Subject to any disclaimer, the term of this patent is extended or adjusted under 35 U.S.C. 154(b) by 0 days.

(21) Appl. No.: 16/009,263

(22) Filed: Jun. 15, 2018

(65) Prior Publication Data
US 2018/0370034 A1    Dec. 27, 2018

(30) Foreign Application Priority Data
Jun. 26, 2017    (KR) .................. 10-2017-0080573

(51) Int. Cl.
*B25J 9/16*    (2006.01)
*G07C 9/00*    (2020.01)
*G07C 9/38*    (2020.01)

(52) U.S. Cl.
CPC .......... *B25J 9/1676* (2013.01); *B25J 9/1694* (2013.01); *G07C 9/00* (2013.01); *G07C 9/38* (2020.01)

(58) Field of Classification Search
CPC .................... B25J 9/16; G07C 9/00
See application file for complete search history.

(56) References Cited

U.S. PATENT DOCUMENTS

| | | | |
|---|---|---|---|
| 2008/0150467 A1* | 6/2008 | Hashimoto | B25J 9/1676 318/568.17 |
| 2014/0067121 A1* | 3/2014 | Brooks | B25J 9/1676 700/255 |
| 2015/0049911 A1* | 2/2015 | Doettling | F16P 3/142 382/103 |
| 2015/0112483 A1* | 4/2015 | Mougin | B25J 9/1676 700/253 |
| 2016/0042635 A1* | 2/2016 | Rosebraugh | G16H 40/20 340/573.1 |
| 2017/0001312 A1* | 1/2017 | Watanabe | B25J 9/1697 |

FOREIGN PATENT DOCUMENTS

| | | |
|---|---|---|
| KR | 10-2003-0010193 | 2/2003 |
| KR | 10-2017-0009268 | 1/2017 |

OTHER PUBLICATIONS

English Specification of 10-2017-0009268.
English Specification of 10-2003-0010193.

* cited by examiner

*Primary Examiner* — Kira Nguyen
(74) *Attorney, Agent, or Firm* — Antonio Ha & U.S. Patent, LLC

(57) ABSTRACT

A access detecting system comprises an access detector installed at an entrance of a work site including a robot or a machine and configured to detect entry or exit of an object to/from the entrance and to output a first control signal when the object approaches the entrance and a second control signal according to a value obtained by adding or subtracting a count of the entry and a count for the exit and a controller configured to power off, or stop a function of, the robot or the machine upon receiving the first control signal and to re-operate the robot or the machine.

5 Claims, 3 Drawing Sheets

ACCESS DETECTING SYSTEM

CROSS-REFERENCE TO RELATED APPLICATIONS

This patent application claims priority under 35 U.S.C. § 119 to Korean Patent Application No. 10-2017-0080573, filed on Jun. 26, 2017, in the Korean Intellectual Property Office, the disclosure of which is incorporated by reference herein in its entirety.

TECHNICAL FIELD

Embodiments of the present disclosure relate to access detecting systems for preventing careless accidents.

DISCUSSION OF RELATED ART

Factories or other work sites may come installed with a safety system to protect workers against accidents. The safety systems may include proximity sensors or infrared sensors that are attached to the machines in the work site to detect a work being around to cut off the supply of power or stop the machines. Typically, such safety system may add a manual control to resume the operation of the stopped machines. However, a worker may mistakenly reactivate the machine without noticing another worker being near the machine, hurting the other worker. This kind of accident may frequently happen in work places. Proximity sensors or infrared sensors may determine approach of a person by detecting his body temperature or motion. However, many workers are typically in the work site, and they move very often while doing various working routines, rendering it difficult for the sensors to precisely detect their motion or temperature variations.

SUMMARY

According to an embodiment, a access detecting system comprises an access detector installed at an entrance of a work site including a robot or a machine and configured to detect entry or exit of an object to/from the entrance and to output a first control signal when the object approaches the entrance and a second control signal according to a value obtained by adding or subtracting a count of the entry and a count for the exit and a controller configured to power off, or stop a function of, the robot or the machine upon receiving the first control signal and to re-operate the robot or the machine.

According to an embodiment, the access detector may include a first sensor configured to detect the object approaching the entrance, a second sensor configured to be activated by the first sensor upon detecting the approach of the object through the first sensor to detect a direction in which the object moves within a predetermined area, and a control signal producer configured to count up and output the first control signal upon detecting the entry of the object into the work site through the second sensor, to count down upon detecting the exit of the object from the work site, and to output the second control signal when the count becomes zero.

According to an embodiment, the access detector may further include a log recorder configured to record a time of the entry upon detecting the entry of the object into the work site through the second sensor and to record a time of the exit when the count becomes zero.

According to an embodiment, the access detecting system may further comprise a central managing server connected with the log recorder. The central managing server may be configured to receive log information about the time of the entry and the time of the exit from the log recorder, to analyze the received log information, and to adjust a period of operation of the robot or the machine to make up for a period during which the robot or the machine is powered off or stops operation.

According to an embodiment, the first sensor may include a passive infrared ray (PIR) detector and the second sensor may include an impulse-radio ultra wide band (IR-UWB) radar.

According to an embodiment, the access detector may be configured to output the first control signal and the second control signal through power line communication (PLC) to the controller.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

The terms used herein are briefly described, and the present disclosure is then described in detail.

Hereinafter, exemplary embodiments of the present disclosure will be described in detail with reference to the accompanying drawings. The same reference denotations may be used to refer to the same elements throughout the specification and the drawings. The present disclosure, however, may be modified in various different ways, and should not be construed as limited to the embodiments set forth herein. As used herein, the singular forms "a," "an," and "the" are intended to include the plural forms as well, unless the context clearly indicates otherwise. Accordingly, the terms used herein should be determined based on their meanings and the overall disclosure, rather than by the terms themselves.

When an element "includes" another element, the element may further include the other element, rather excluding the other element, unless particularly stated otherwise. Further, the terms "unit," "module," or "part" as used herein denote a unit processing at least one function or operation, and a unit, module, or part may be implemented in hardware, software, or a combination thereof.

Embodiments of the present disclosure are now described with reference to the accompanying drawings in such a detailed manner as to be easily practiced by one of ordinary skill in the art. However, the present disclosure may be implemented in other various forms and is not limited to the embodiments set forth herein. For clarity of the disclosure, irrelevant parts are removed from the drawings, and similar reference denotations are used to refer to similar elements throughout the specification.

Figure 1:
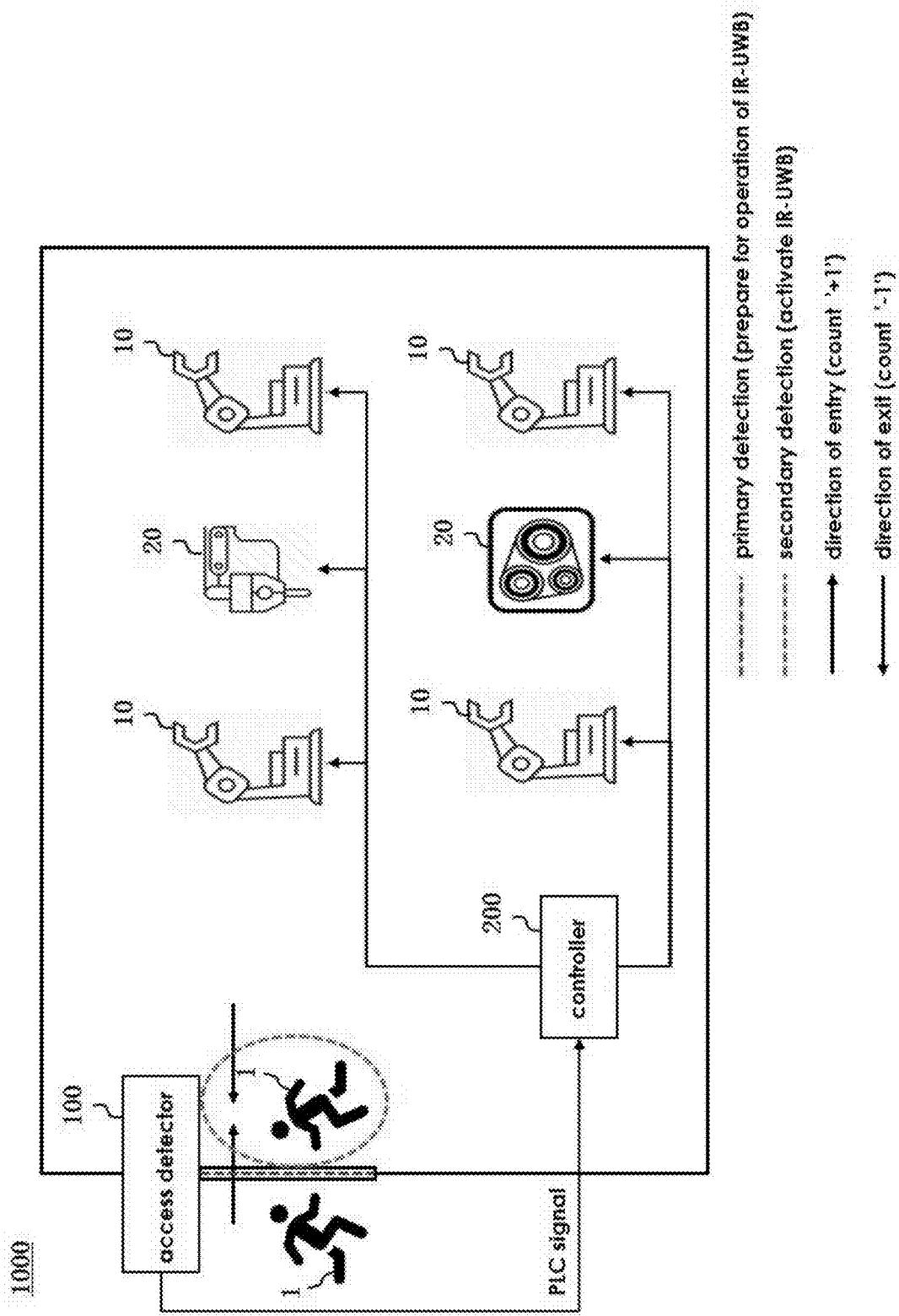
FIG. 1 is a view illustrating an overall configuration of an access detecting system according to an embodiment.
Figure 2:
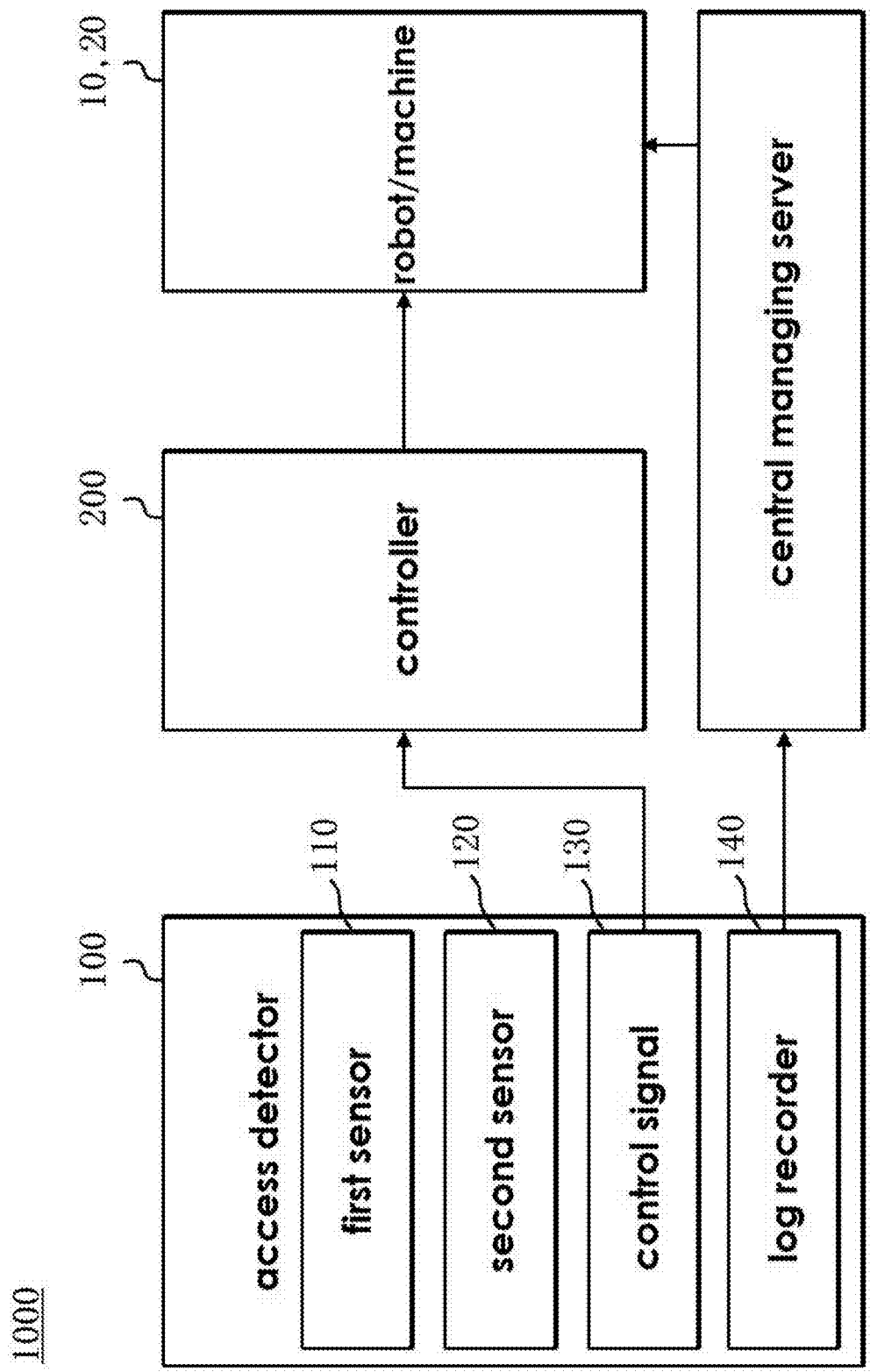
FIG. 2 is a block diagram illustrating an access detecting system according to an embodiment.
Figure 3:
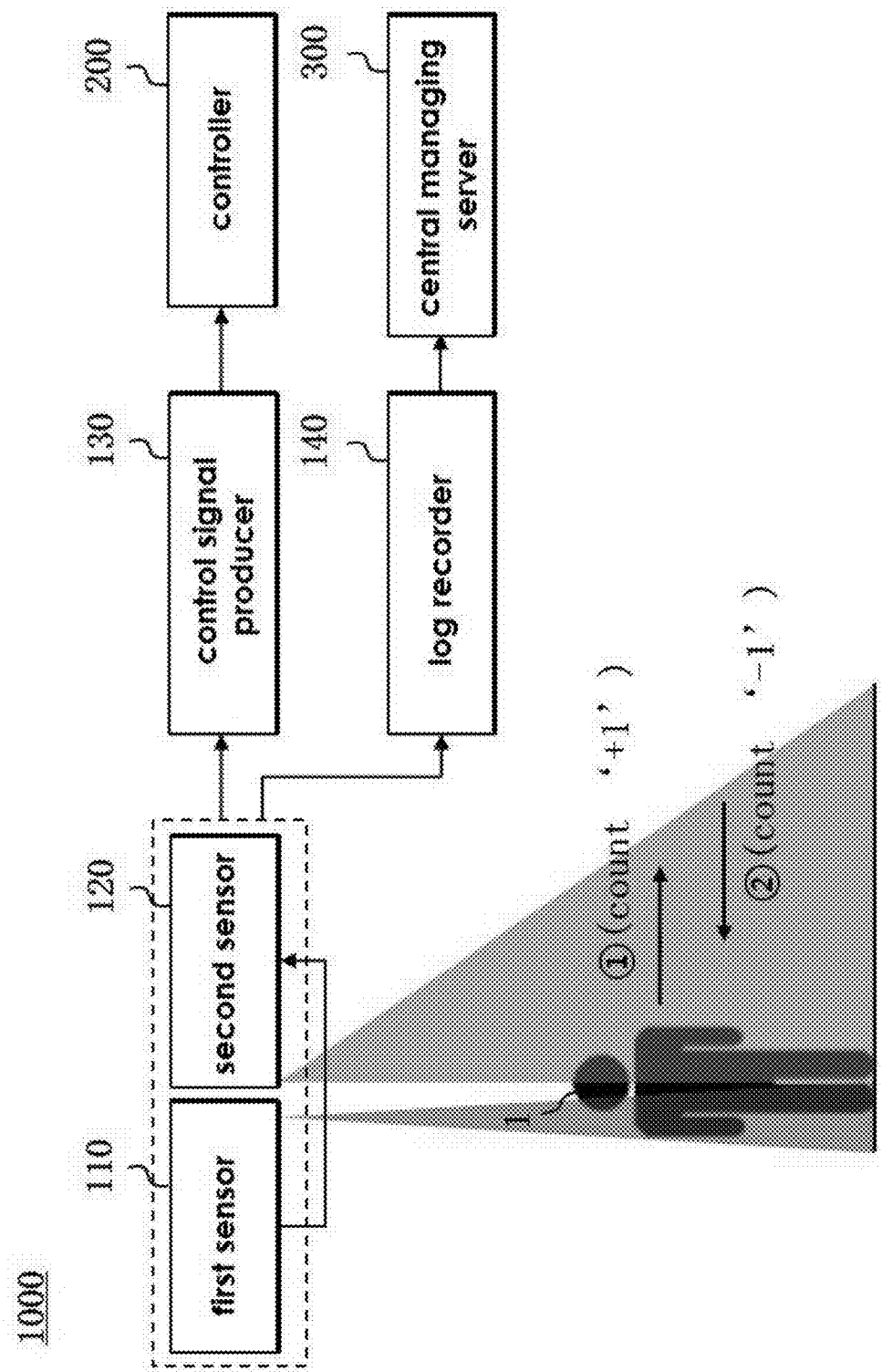
FIG. 3 is a block diagram illustrating an access detecting system according to an embodiment.

FIG. 1 is a view illustrating an overall configuration of an access detecting system according to an embodiment. FIG. 2 is a block diagram illustrating an access detecting system according to an embodiment. FIG. 3 is a block diagram illustrating an access detecting system according to an embodiment.

Referring to FIGS. 1 to 3, according to an embodiment, an access detecting system 1000 may include an access detector 100 and a controller 200. The access detecting system 1000 may further include a central managing server 300.

The access detector 100 may be installed at the entrance or exit of a work site where multiple automated robots 10 and machines 20 are installed and operated. For example, the access detector 100 may be installed at the top of the entrance of a safety guard-installed processing line in the work site. The access detector 100 may detect entry or exit of an object 1 approaching the entrance, output a first control signal when the object 1 enters, and output a second control signal according to a value obtained by adding or subtracting a count of entry and a count of exit detected. The access detector 100 may include a first sensor 110, a second sensor 120, and a control signal producer 130. The access detector 100 may further include a log recorder 140.

The first sensor 110 may detect the object 1 that approaches the entrance. The first sensor 110 may include a passive infrared ray (PIR) detector and may operate as a primary detector for the access detector 100.

The PIR detector may be a sensor for detecting infrared (IR) light whose wavelength is close to that of visible light. The PIR detector may convert IR light into heat and measure variations in physical quantity due to the heat. The PIR detector may be used to measure the distance to a human being, an animal, or such a target. The PIR detector may be a pyroelectric sensor that may use the pyroelectric effect that induces electric charges by variations in polarization in a material when the material absorbs IR light, thus producing an electromotive force. The pyroelectric sensor may sense differences in far IR light between the ambient environment and an object (e.g., a human being or animal) producing far IR light and may detect the motion of the object using the differences.

When the approach of the object 1 is detected by the first sensor 110, the second sensor 120 may be activated by the first sensor 110, detecting the direction ① or ② in which the object 1 moves within a predetermined area. The second sensor 120 may include an impulse-radio ultra wide band (IR-UWB) radar. Sensing information obtained by the second sensor 120 may be used to determine an operation of the robot 10 or the machine 20 in the work site. The second sensor 120 may be in a sleep state before the first sensor 110 recognizes the object. The second sensor 120 may be activated to operate by a sensing signal from the first sensor 110.

The IR-UWB radar may be an ultra low-power sensor that may radiate an impulse signal that is a nano second or shorter and receive and detect a signal reflected by a target (e.g., the object 1), thereby estimating the distance from the target or the presence of the target.

The second sensor 120 may detect a direction in which the object 1 moves, e.g., whether the object moves from the entrance towards (①) the robot 10 or machine 20 or moves towards the entrance (②) in a predetermined area near the entrance using the IR-UWB radar.

When the second sensor 120 detects the entry of the object 1 into the work site, the control signal producer 130 may count up (count '+1') and output a first control signal to the controller 200. Upon receiving the first control signal from the control signal producer 130, the controller 200 may temporarily power off or stop the operation of the robot 10 or machine 20 which is operated in the work site.

Upon detecting the object 1 exiting the work site with the first control signal output, the control signal producer 130 may count down (count '−1'). When the count obtained for the movement of the object 1 becomes zero (count '0'), the control signal producer 130 may output a second control signal to the controller 200. Upon receiving the second control signal from the control signal producer 130, the controller 200 may re-operate the robot 10 or machine 20 that has temporarily stopped operation in the work site, and any signal of object perception from the first sensor 110 may be disregarded.

However, when the count obtained for the movement of the object 1 becomes more than zero, the control signal producer 130 may abstain from outputting the second control signal or may maintain the output of the first control signal.

The control signal producer 130 may transmit the first or second control signal to the controller 200 in various communication schemes. The control signal producer 130 may transmit various control signals to the controller 200 via, e.g., power line communication (PLC).

When the second sensor 120 detects entry of the object 1 to the inside of the work site, the log recorder 140 may record the time of the entry of the object 1, and when the count obtained by the control signal producer 130 becomes zero, the log recorder 140 may record the time of the exit of the object 1.

The log recorder 140 may transmit log information about the recorded time of entry and the recorded time of exit to an external server, e.g., the central managing server 300. The log information may be transmitted via various communication schemes, such as wireless Internet communication or PLC. The log recorder 140 may transmit the log information to a manager terminal (not shown) in the work site as well as to the central managing server 300.

Upon receiving the first control signal from the access detector 100, the controller 200 may cut off the supply of power to, or stop the function of, the automated robot 10 and machine 20. Upon receiving the second control signal, the controller 200 may re-operate the powered-off or stopped automated robot 10 and machine 20. The controller 200 may perceive the first control signal as an operation stop signal and the second control signal as an operation start signal or an operation resume signal, controlling the power or operation of the automated robot 10 and machine 20.

The central managing server 300 may receive the log information about the time of entry and the time of exit recorded by the log recorder 140 and analyze the received log information, adjusting the time of operation of the automated robot 10 and machine 20 to make up for the period of the stopped operation of the automated robot 10 and machine 20.

For example, the central managing server 300 may perform control to analyze the log information, calculate the period of the stopped operation, and extend the operation of the automated robot 10 and machine 20 by the calculated period, compensating for the delayed work. The central managing server 300 may also analyze the recorded log information to grasp, e.g., entry or exit of a worker into/from the work site, and process the grasped information to produce data for increasing the productability.

To better prevent careless accidents, a second PIR detector or IR-UWB radar may be installed in the work site to perform a secondary identification process to indicate whether a worker is in the work site, thereby enabling the controller 200 to re-operate various robots 10 or machines 20. In other words, although the controller 200 receives the second control signal from the control signal producer 130, the control operation as per the second control signal may be performed when no sensing signal is received from the second PIR detector or IR-UWB radar within a predetermined time. Thus, the robot 10 and machine 20 may be re-operated after further ensuring on whether a worker is inside the work site, more thoroughly protecting workers against accidents.

An alarm, e.g., a buzzer, may be added which may interoperate with the controller 200 and enables the worker to easily obtain information about a preliminary control operation of the controller 200. For example, when the controller 200 receives the first control signal to temporarily power off or stop the function of the robot 10 or machine 20, the alarm may produce a particular alert to stop operation, and when the worker leaves out of the work site, and thus, the robot 10 or machine 20 re-operates, the alarm may output a particular alert to re-operate the robot 10 or machine 20 before the robot 10 or machine 20 indeed re-operates. After the re-operation alert is off, the robot 10 or machine 20 may be re-operated.

According to various embodiments, an access detecting system may detect an object moving within a work area of an industrial robot or machine and control the operation of the robot or machine, ensuring workers' safety. Further, the access detecting system may analyze and control the operation of the robot or machine, enhancing productability.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A access detecting system, comprising:
   an access detector installed at an entrance of a work site including a robot or a machine and configured to detect entry or exit of an object to/from the entrance and to output a first control signal when the object approaches the entrance; and
   a controller configured to power off, or stop a function of, the robot or the machine upon receiving the first control signal and to re-operate the robot or the machine upon receiving a second control signal, wherein
   the access detector includes a first sensor, a second sensor, and a control signal produce, wherein
   the first sensor is configured to detect the object approaching the entrance, wherein
   the second sensor is configured to be activated by the first sensor upon detecting the approach of the object through the first sensor to detect a direction in which the object moves within a predetermined area, and wherein
   the control signal producer is configured to count up by one and output the first control signal upon detecting the entry of the object into the work site through the second sensor, to count down by one upon detecting the exit of the object from the work site, and to output the second control signal when the count becomes zero.

2. The access detecting system of claim 1, wherein the access detector further includes a log recorder configured to record a time of the entry upon detecting the entry of the object into the work site through the second sensor and to record a time of the exit when the count becomes zero.

3. The access detecting system of claim 2, further comprising a central managing server connected with the log recorder, wherein the central managing server is configured to receive log information about the time of the entry and the time of the exit from the log recorder, to analyze the received log information, and to adjust a period of operation of the robot or the machine to make up for a period during which the robot or the machine is powered off or stops operation.

4. The access detecting system of claim 1, wherein the first sensor includes a passive infrared ray (PIR) detector and the second sensor includes an impulse-radio ultra wide band (IR-UWB) radar.

5. The access detecting system of claim 1, wherein the access detector is configured to output the first control signal and the second control signal through power line communication (PLC) to the controller.

* * * * *